Nov. 17, 1936.  M. W. McCONKEY  2,060,885
BRAKE
Original Filed Feb. 11, 1929

INVENTOR.
MONTGOMERY W. McCONKEY
BY
ATTORNEY

Patented Nov. 17, 1936

2,060,885

UNITED STATES PATENT OFFICE 2,060,885

BRAKE

Montgomery W. McConkey, South Bend, Ind., assignor to Bendix Brake Company, South Bend, Ind., a corporation of Illinois Original application February 11, 1929, Serial No. 339,000. Divided and this application March 7, 1931, Serial No. 520,800

12 Claims. (Cl. 188—79.5)

This invention relates to brakes and more particularly to internal expanding brakes.

This application is a division of my pending application, Serial No. 339,000, filed February 11, 1929.

Broadly, the invention comprehends means for adjusting the friction elements of brakes to compensate for wear. In the illustrated embodiment of the invention the articulated ends of the friction elements are connected by a floating adjusting device including a threaded member suitably secured to one of the friction elements and provided with a diametral slot for the reception of the other friction element, together with a nut positioned for travel on the threaded member adapted to engage the friction members positioned in the slot, so that the relative position of the friction members to the braking surface of the drum may be adjusted.

An object of the invention is to provide a simple and inexpensive adjusting means for the friction elements of an internal expanding brake.

Another object of the invention is to provide adjusting means having relatively few parts which may be easily and quickly assembled.

A feature of the invention is a ball and socket connection between the articulated ends of the friction elements, including a simple means for securing a ball and socket connection to the friction elements and means for adjusting the connection.

The above objects and features of the invention including various desirable details of structure will be apparent from the following description of the illustrative embodiments shown in the accompanying drawing, in which.

Figure 1:
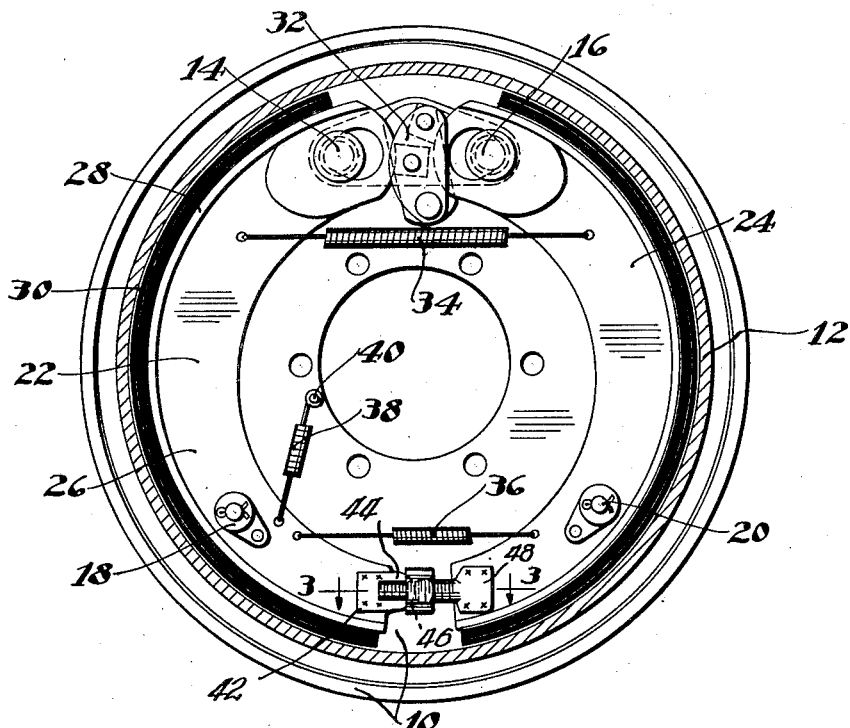
Figure 1 is a vertical sectional view taken just back of the head of the drum illustrating the friction element in side elevation and showing the invention as applied.
Figure 2:
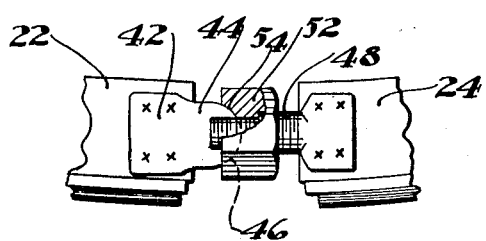
Figure 2 is an enlarged detail view of the adjusting device partly in elevation and partly in section.

Referring to the drawing for more specific details of the invention 10 represents a fixed support such as a backing plate having associated therewith a rotatable drum 12 which may be secured to a wheel, not shown.

Positioned on the backing plate are suitable anchors 14 and 16 and steady rests 18 and 20, and supported on the steady rests 18 and 20 are friction elements 22 and 24. Each of these elements comprises a web 26 supporting a rim 28 to which is suitably secured a lining 30 adaptable for cooperation with the backing surface of the drum.

The separable ends of the friction elements have transverse openings for the reception of the anchors 14 and 16 and positioned between the separable ends of the friction elements is a floating operating cam 32 adaptable for spreading the friction element into engagement with the braking surface of the drum, and connected between the articulated ends of the friction element is an adjusting device to be hereinafter described.

As shown, the friction elements 22 and 24 are connected by return springs 34 and 36 and one of the friction elements is connected by an auxiliary return spring 38 to a fixed support 40 on the backing plate. These springs serve upon release of the applied force to return the friction elements to the off position, and to retain them when in the off position in proper spaced relation to the braking surface of the drum.

In the preferred embodiment of the invention the friction element 22 has spot-welded or otherwise secured thereto a plate 42 having an extended portion 44 provided with a rounded end 46, and spot-welded or otherwise secured to the friction element 24 is a threaded member 48 having a diametrical slot 50 receiving the extended portion 44 on the friction element 22, and positioned for travel on the threaded member 48 between the friction element 24 and the extended portion 44 is a nut 52 having a hemi-spherical recess 54 for the reception of the rounded end 46 on the member 42. By adjusting the nut 52 on the threaded member 48 the position of the friction elements 22 and 24 with respect to each other and to the braking surface of the drum may be definitely determined.

Figure 4:
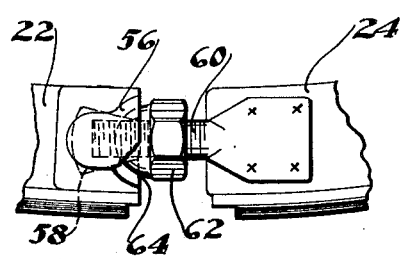
Figure 4 is a modified form of the invention.
Figure 3:
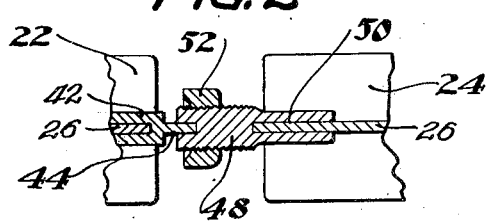
Figure 3 is a sectional view substantially on line 3—3 of Figure 1.

In the modification shown in Figure 4, the friction element 22 is provided at its articulated end with a hemi-spherical socket 56 and a cut away portion 58 communicating with the socket. Suitably secured to the friction element 24 is a threaded member 60 having positioned thereon for travel a nut 62 provided with a hemi-spherical face 64 seated in the socket 56, the free end of the threaded member 60 being positioned in the cut away portion 58. By adjusting the nut 62 the relative position of the friction elements 22 and 24 to the braking surface of the drum may be determined.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention what I claim as new and desire to secure by Letters Patent is:

1. An adjusting device comprising a threaded member having a diametrical slot, a member positioned for movement in the slot, a rounded end on the movable member, a member positioned for travel on the threaded member having a recess receiving the rounded end of the movable member.

2. An adjusting member comprising a threaded member having a diametrical slot, a member movable in the slot, a rounded end on the movable member, a nut positioned for travel on the threaded member having a hemi-spherical recess receiving the rounded end on the movable member.

3. A brake comprising friction elements arranged end to end, means connecting adjacent ends of the friction elements including a threaded member rigidly secured to one of the friction elements and provided with a slot, a part on the other friction element positioned for movement in the slot, and a nut positioned for travel on the threaded member engaging the part.

4. A brake comprising at least two friction elements arranged end to end, a threaded member secured to one of the friction elements and provided with a slot, a part on the other friction element having a rounded end positioned for movement in the slot and a nut positioned for travel on the threaded member having a hemi-spherical recess for the reception of the rounded end.

5. A brake comprising friction elements arranged end to end, means connecting adjacent ends of the friction elements including a threaded member carried by one of the friction elements and provided with a diametrical slot, a member secured to the other friction element and positioned for movement in the slot, a rounded end on the movable member and a nut positioned for travel on the threaded member having a hemi-spherical recess receiving the rounded end of the movable member.

6. A brake comprising friction elements arranged end to end, a ball and socket connection between adjacent ends of the friction elements and rigidly secured to one of said ends and means including a screw for varying the relative position of the socket with respect to at least one of the friction elements.

7. A brake comprising a backing plate, a rotatable drum associated therewith, friction elements positioned on the backing plate adaptable for co-operation with the drum, means connecting adjacent ends of the friction elements including a threaded member secured to one of the friction elements and provided with a diametrical slot, an extension on the other friction element positioned for movement in the slot, a rounded end on the extension and a member positioned for travel on the threaded member having a hemi-spherical recess engaging the round end on the extended member.

8. A brake comprising friction elements arranged end to end, one of the friction elements having a socket, a threaded member positioned on and rigidly secured to the other friction element, a member positioned for travel on the threaded member and a hemi-spherical face on the member positioned for travel engaging the socket.

9. A brake comprising friction elements arranged end to end, one of the friction elements having a socket and cut away portion communicating with the socket, a threaded member rigidly secured to the other friction element and a member positioned for travel on the threaded member having a hemi-spherical face seated in the socket.

10. A brake comprising at least two friction elements arranged end to end, one of the friction elements having a socket, means connecting the adjacent ends of the friction elements including a threaded member on and rigidly secured to the other friction element, and a nut positioned for travel on the threaded member having a hemi-spherical face engaging the socket on the other member.

11. A brake friction member formed with a web and having a threaded adjusting device which is slotted and which straddles and is rigidly secured to the web of the friction member, in combination with a nut threaded on said device.

12. An adjusting device comprising, in combination with a pair of shoes having aligned webs, a threaded member rigidly secured to one web and projecting beyond the end thereof and having a slot in its projecting part, the other web being positioned for movement in the slot and a member positioned for travel on the threaded member in engagement with said other web.

MONTGOMERY W. McCONKEY.